US011192730B1

(12) United States Patent
Schlenker (10) Patent No.: US 11,192,730 B1
(45) Date of Patent: Dec. 7, 2021

(54) MATERIAL TRANSFER SYSTEM FOR MACHINE

(71) Applicant: Caterpillar Paving Products Inc., Brooklyn Park, MN (US)

(72) Inventor: Brian Joe Schlenker, Shoreview, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/991,161

(22) Filed: Aug. 12, 2020

(51) Int. Cl.
*B65G 65/00* (2006.01)
*B65G 47/44* (2006.01)
*B65G 47/76* (2006.01)
*E01C 23/088* (2006.01)
*B65G 67/08* (2006.01)

(52) U.S. Cl.
CPC ............ *B65G 65/005* (2013.01); *B65G 47/44* (2013.01); *B65G 47/766* (2013.01); *E01C 23/088* (2013.01); *B65G 67/08* (2013.01); *B65G 2201/042* (2013.01); *B65G 2203/0283* (2013.01); *B65G 2203/041* (2013.01); *B65G 2811/095* (2013.01)

(58) Field of Classification Search
CPC .... B65G 65/005; B65G 47/44; B65G 47/766; B65G 69/0441; B65G 69/00; E01C 23/088
USPC .......................... 198/640, 641; 141/391, 198
See application file for complete search history.

(56) References Cited

U.S. PATENT DOCUMENTS

| 4,183,158 | A | | 1/1980 | Satterwhite | |
|---|---|---|---|---|---|
| 4,978,000 | A | * | 12/1990 | Mohr | B65G 39/10 198/641 |
| 5,286,158 | A | * | 2/1994 | Zimmerman | E01C 19/2045 198/317 |
| 6,135,171 | A | * | 10/2000 | Weakly | B65G 47/44 141/286 |
| 9,764,910 | B2 | * | 9/2017 | Berning | E01C 23/088 |
| 9,840,816 | B2 | | 12/2017 | Berning et al. | |
| 9,873,142 | B2 | | 1/2018 | Bjorge | |
| 10,315,858 | B2 | | 6/2019 | Hirman | |
| 10,428,471 | B1 | | 10/2019 | Hirman et al. | |
| 2014/0084665 | A1 | | 3/2014 | Mötz et al. | |
| 2020/0063385 | A1 | | 2/2020 | Verhaelen et al. | |

FOREIGN PATENT DOCUMENTS

CN 108004895 5/2018

* cited by examiner

*Primary Examiner* — James R Bidwell
(74) *Attorney, Agent, or Firm* — Jeff A. Greene (57) ABSTRACT

A material transfer system for a machine having a conveyor adapted to transfer material into a material holding space of a receptacle. The material transfer system also includes an adjustable deflector positioned proximate to a discharge end of the conveyor. The material transfer system further includes a sensor positioned proximate to the discharge end of the conveyor. The sensor is configured to monitor the material holding space of the receptacle. The material transfer system includes a controller communicably coupled with the adjustable deflector and the sensor. The controller is configured to receive a first input signal from at least one of the sensor and a machine operator for adjusting a position of the adjustable deflector, determine an optimal position of the adjustable deflector based on receipt of the first input signal, and generate a first command signal for adjusting the position of the adjustable deflector to the optimal position.

20 Claims, 6 Drawing Sheets

MATERIAL TRANSFER SYSTEM FOR MACHINE

TECHNICAL FIELD

The present disclosure relates to a material transfer system for a machine. More particularly, the material transfer system allows material to be transferred from the machine to a receptacle.

BACKGROUND

A construction machine, such as a cold planer, is used to mill various surfaces for repair and/or replacement purposes. The machine typically includes a conveyor system that allows transfer of milled material, such as asphalt or concrete, from a milling chamber of the machine to a receptacle, such as a haul vehicle. For example, the conveyor system may include a first conveyor that receives the material from the milling chamber and a second conveyor that transfers the material from the first conveyor towards the receptacle.

An efficient and even fill up of the receptacle with the material by an operator may be a cumbersome process. More particularly, the operator may have to adjust a position of the second conveyor for uniform material distribution. For example, the second conveyor may have to be moved vertically or horizontally to allow uniform material distribution. Further, a conveyor speed may have to be controlled to alter a trajectory of the material into the receptacle. In some examples, the receptacle may have to be reoriented relative to the machine for uniform material distribution. Thus, the conventional setup may require communication between the operator of the machine and an operator of the receptacle to coordinate a position of the receptacle relative to the machine to direct the material towards a specific location in the receptacle.

U.S. Pat. No. 4,183,158 describes an excavating loading system. Conveyors of the excavating loading system include cross conveyors and a main conveyor for receiving a material from an excavating wheel assembly. The main conveyor transports the material rearwardly from the excavating wheel assembly towards an opposite end of a vehicle. An auxiliary conveyor assembly is provided with the vehicle to receive the material from the main conveyor and to transport the material laterally or rearwardly. The auxiliary conveyor assembly has inner and outer conveyors mounted with a discharge end of one conveyor adjacent a receiving end of the other conveyor. A variably position able deflector plate is provided to direct the discharge of material.

SUMMARY

In an aspect of the present disclosure, a material transfer system for a machine is provided. The material transfer system includes a conveyor adapted to transfer material into a material holding space of a receptacle. The conveyor defines a discharge end. The material transfer system also includes an adjustable deflector positioned proximate to the discharge end of the conveyor. The adjustable deflector is adapted to deflect the material exiting the conveyor. The material transfer system further includes a sensor positioned proximate to the discharge end of the conveyor. The sensor is configured to monitor the material holding space of the receptacle. The material transfer system includes a controller communicably coupled with the adjustable deflector and the sensor. The controller is configured to receive a first input signal from at least one of the sensor and a machine operator for adjusting a position of the adjustable deflector. The controller is also configured to determine an optimal position of the adjustable deflector based on receipt of the first input signal. The controller is further configured to generate a first command signal for adjusting the position of the adjustable deflector to the optimal position.

In another aspect of the present disclosure, a method of operating a machine is provided. The machine includes a conveyor adapted to transfer material into a material holding space of a receptacle. The method includes receiving, by a controller of the machine, a first input signal from at least one of a sensor of the machine and a machine operator. The sensor is positioned proximate to a discharge end of the conveyor for monitoring the material holding space of the receptacle. The method also includes determining, by the controller, an optimal position of an adjustable deflector of the machine based on receipt of the first input signal. The adjustable deflector is positioned proximate to the discharge end of the conveyor for deflecting the material exiting the conveyor. The method further includes generating, by the controller, a first command signal to adjust a position of the adjustable deflector to the optimal position.

DETAILED DESCRIPTION

Figure 1:
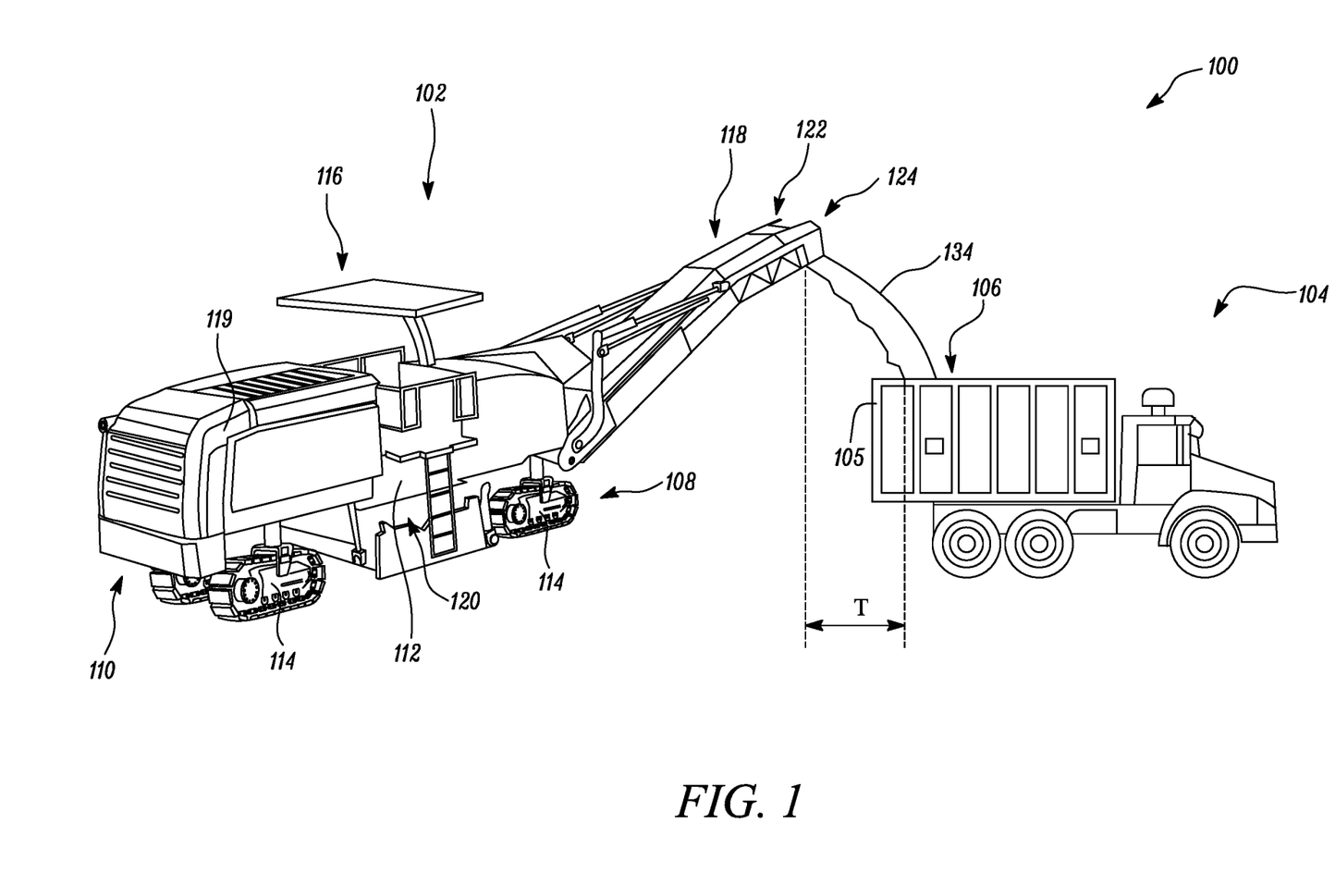
FIG. 1 illustrates a machine and a receptacle positioned at a worksite, in accordance with the present disclosure.

Wherever possible, the same reference numbers will be used throughout the drawings to refer to same or like parts. FIG. 1 illustrates an exemplary worksite 100. The worksite 100 may embody any type of worksite, such as mining, construction, forestry, farming, transportation, or any other worksite known in the art. A machine 102, illustrated as a cold planer herein, and a receptacle 104 is positioned at the worksite 100. The machine 102 mills various surfaces and transfers milled material 134, hereinafter referred to as the material 134, to the receptacle 104. The receptacle 104 includes a dump truck herein. It should be noted that the receptacle 104 may embody any other on-highway truck. In other embodiments, the receptacle 104 may include any type of haul vehicle, such as a railcar, a freight truck, etc. The receptacle 104 includes a truck bed 105. The truck bed 105 defines a material holding space 106 of the receptacle 104. It should be noted that, in some embodiments, the receptacle 104 may embody a dump site or a stationary container such that the machine 102 transfers the material 134 to the dump site or the stationary container, without any limitations.

Further, the machine 102 defines a front end 108 and a rear end 110. The machine 102 includes a frame 112. The frame 112 supports a number of ground engaging members 114 of the machine 102. The ground engaging members 114 are embodied as tracks herein. The machine 102 includes an operator station 116 having one or more input devices that may be used to perform one or more machine operations. A machine operator may be present in the operator station 116 for operating the machine 102.

The machine 102 further includes an engine (not shown) that provides power for mobility and/or other machine related operations. For example, the engine provides operating power to the ground engaging members 114, a milling drum (not shown), a conveyor system 118, and the like. The engine is disposed within an engine enclosure 119 proximate to the rear end 110 of the machine 102. Further, the machine 102 includes the milling drum provided within a milling chamber 120. The milling drum may mill/break materials, such as asphalt or concrete, into smaller pieces.

Further, the machine 102 includes the conveyor system 118. The conveyor system 118 includes a first conveyor (not shown) and a second conveyor 122, hereinafter interchangeably referred to as the conveyor 122. The first conveyor 122 pulls the material 134 from the milling chamber 120 and directs the material 134 towards the front end 108 of the cold planer. Further, the second conveyor 122 receives the material 134 from the first conveyor and directs the material 134 towards the receptacle 104. The first conveyor 122 includes a number of components (not shown), such as a continuous belt and a motor for driving the belt.

Figure 2:
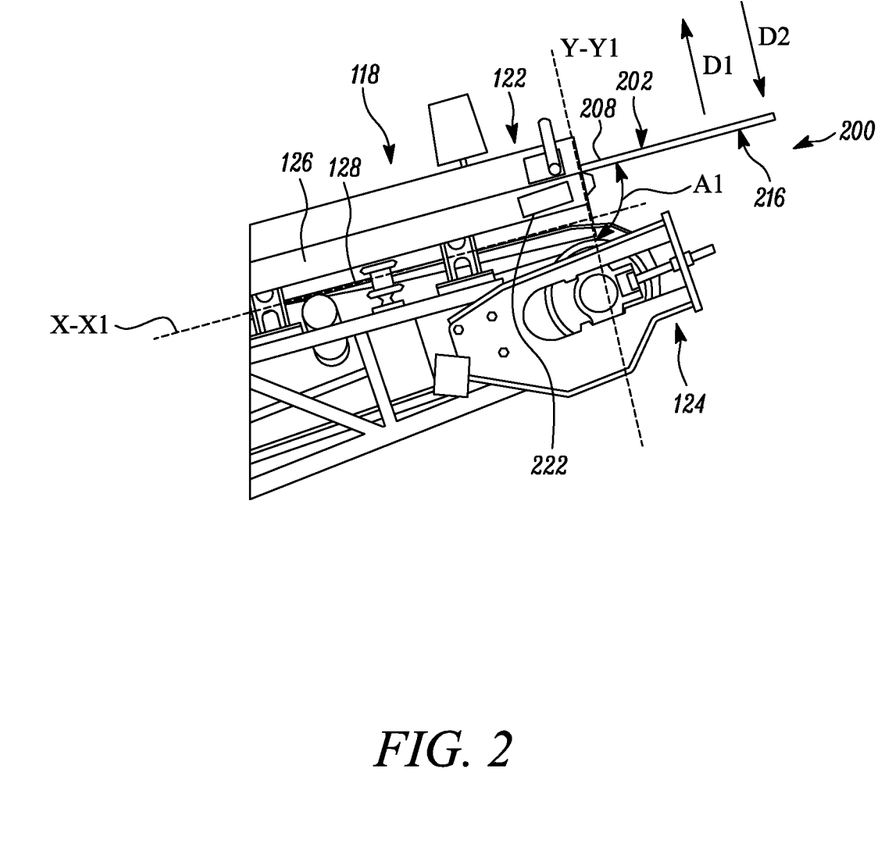
FIGS. 2 and 3 illustrate an adjustable deflector associated with a material transfer system of the machine of FIG. 1, in accordance with the present disclosure.

Referring now to FIG. 2, a portion of the second conveyor 122 is illustrated. The conveyor 122 defines a discharge end 124. The discharge end 124 is disposed distal to the first conveyor. The material 134 (see FIG. 1) exits the second conveyor 122 from the discharge end 124. The conveyor 122 defines a longitudinal axis "X-X1", a vertical axis "Y-Y1", and a lateral axis "Z-Z1" (shown in FIG. 3). The second conveyor 122 includes a frame structure 126. The frame structure 126 collectively includes various structural members that provide support to various components of the second conveyor 122 and allow connection of the second conveyor 122 with the frame 112 (see FIG. 1). The second conveyor 122 also includes a continuous belt 128 that is driven by a motor 130 (shown in FIG. 5). The continuous belt 128 and the motor 130 may be supported by the frame structure 126 of the second conveyor 122. A conveyor speed of the second conveyor 122 may be varied based on variation in a speed of the motor 130. Further, the second conveyor 122 includes one or more actuators 132 (shown in FIG. 5) that allow adjustment of a conveyor position of the second conveyor 122 relative to the frame 112. For example, the actuators 132 may adjust the conveyor position such that the discharge end 124 is raised or lowered relative to the receptacle 104. Further, the conveyor 122 may also swing side to side to adjust the conveyor position. The actuators 132 may be hydraulic actuators, electric actuators, or pneumatic actuators.

The present disclosure is related to a material transfer system 200 for the machine 102. The material transfer system 200 includes the conveyor 122 to transfer the material 134 into the material holding space 106 (see FIG. 1) of the receptacle 104 (see FIG. 1). The material transfer system 200 also includes an adjustable deflector 202 positioned proximate to the discharge end 124 of the conveyor 122. The adjustable deflector 202 deflects the material 134 exiting the conveyor 122. The adjustable deflector 202 includes one or more actuators 204 (shown in FIG. 5) communicably coupled with a controller 206 (shown in FIG. 5) for receiving a first command signal. It should be noted that the adjustable deflector 202 may include a single actuator 204 or multiple actuators 204, based on a total number of parts/components of the adjustable deflector 202. This disclosure will be described in relation to the single actuator 204, however, the details can be equally applicable to multiple actuators 204, without any limitations.

Figure 5:
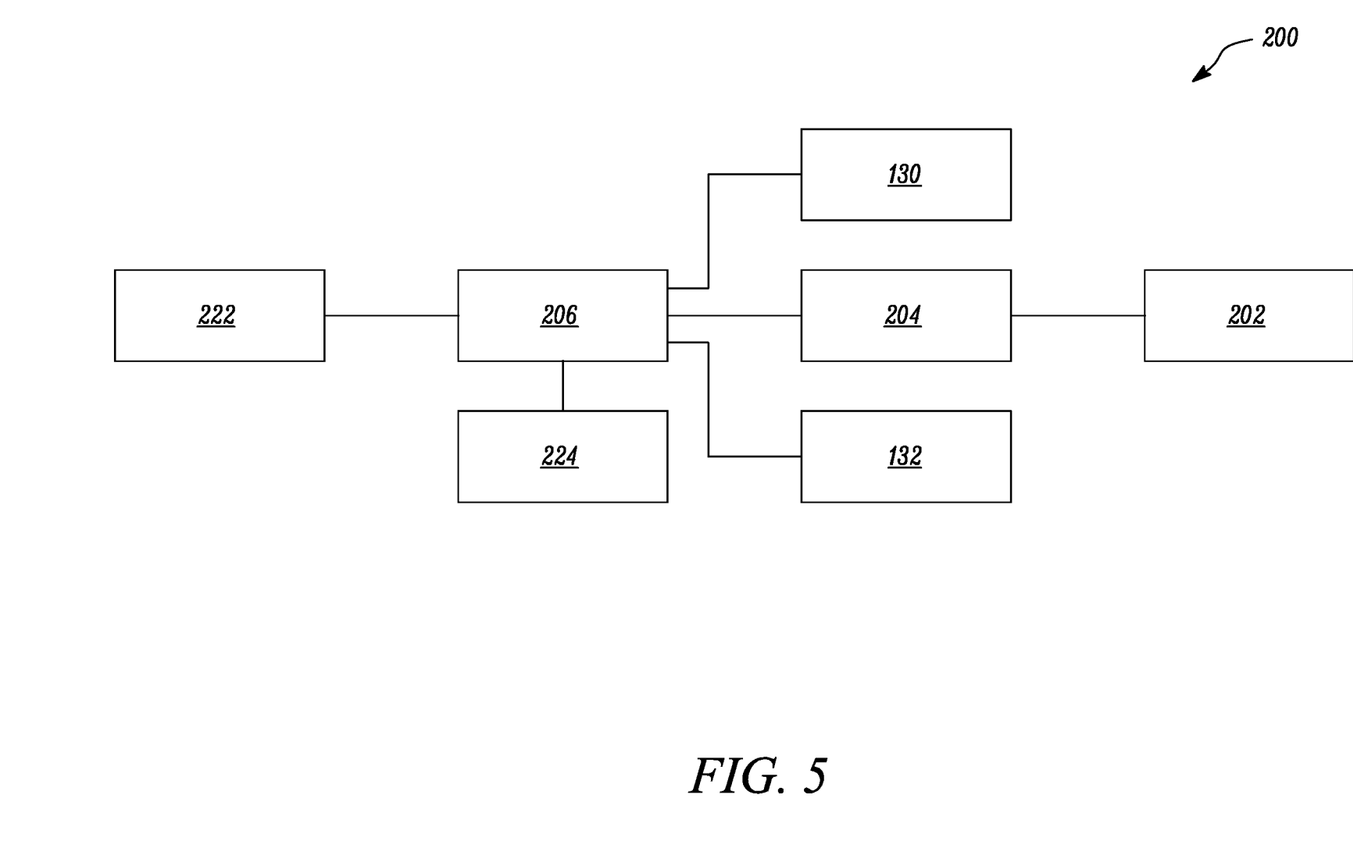
FIG. 5 illustrates a block diagram of the material transfer system associated with the machine of FIG. 1.

The one or more actuators 204 adjust the position of the adjustable deflector 202 relative to the conveyor 122. More particularly, the actuators 204 may adjust the position of the adjustable deflector 202 relative to the frame structure 126. One end of the actuators 204 may be connected to the frame structure 126, whereas another end of the actuator 204 may be connected to the adjustable deflector 202. The actuators 204 may include features that may allow connection of the actuators 204 with the adjustable deflector 202 and the frame structure 126. The actuators 204 may embody hydraulic actuators or pneumatic actuators. In some other embodiments, the actuators 204 may include piezoelectric actuators, electroactive polymer actuators, electric motors, and the like. Further, one or more position sensors (not shown) may be associated with the actuators 204. The position sensors may generate signals indicative of a current position of the adjustable deflector 202 and may assist in adjustment of the position of the adjustable deflector 202.

The adjustable deflector 202 may be provided in various forms capable of redirecting the flow of milled material in one or both of a vertical direction and a horizontal direction as the material leaves the conveyor 122. In one exemplary embodiment, the adjustable deflector 202 includes one or more deflector plates 208, 210, 212 to redirect the flow of milled material at the discharge end 124 of the conveyor 122, (shown in FIGS. 2 and 3). In the illustrated example, the adjustable deflector 202 includes three deflector plates 208, 210, 212. More particularly, the adjustable deflector 202 include the first deflector plate 208, the second deflector plate 210 (shown in FIG. 3), and the third deflector plate 212 (shown in FIG. 3). In some other embodiments, the adjustable deflector 202 may include more than three deflector plates 208, 210, 212, as per application requirements. It should be noted that a position of one or more of the first, second, and third deflector plates 208, 210, 212 may be adjusted to provide the material flow towards a specific location. In other examples, the adjustable deflector 202 may include the first deflector plate 208 or a combination of the second and third deflector plates 210, 212. The one or more deflector plates 208, 210, 212 may be made up of any material such as aluminum, iron, steel, nickel, plastic, polymers, etc. The deflector plates 208, 210, 212 may have a square shape, a rectangular shape, and the like.

The first deflector plate 208 is connected to the frame structure 126. In an example, the first deflector plate 208 may be pivotally connected to the frame structure 126. The first deflector plate 208 extends along the longitudinal axis "X-X1". Further, the actuator 204 may allow movement of the first deflector plate 208 relative to the frame structure 126. The actuator 204 may allow movement of the first deflector plate 208 relative to the vertical axis "Y-Y1". In an example, a single actuator 204 may be used to move the first deflector plate 208 relative to the frame structure 126. Alternatively, two actuators 204 may be used to move the first deflector plate 208 relative to the frame structure 126.

Further, the first deflector plate 208 may move in a first direction "D1" or a second direction "D2" that is opposite to the first direction "D1". The first deflector plate 208 is disposed at a first angle "A1" relative to the vertical axis "Y-Y1". Accordingly, the first deflector plate 208 may allow adjustment of a material flow based on the first angle "A1". The first deflector plate 208 defines a first deflector surface 216 that deflects a portion of the material 134 exiting the conveyor 122 towards the receptacle 104. In this embodiment, the first deflector surface 216 is a flat surface. In other embodiments, the first deflector surface 216 may include a concave shape, a biconcave shape, a convex shape, and the like. A throw distance "T" (shown in FIG. 1) of the material 134 from the second conveyor 122 decreases as the first angle "A1" decreases. Further, the throw distance "T" of the material 134 increases as the first angle "A1" increases. It should be noted that the throw distance "T" may vary based on various parameters, such as the conveyor speed, the conveyor position, and the position of the adjustable deflector 202.

Figure 3:
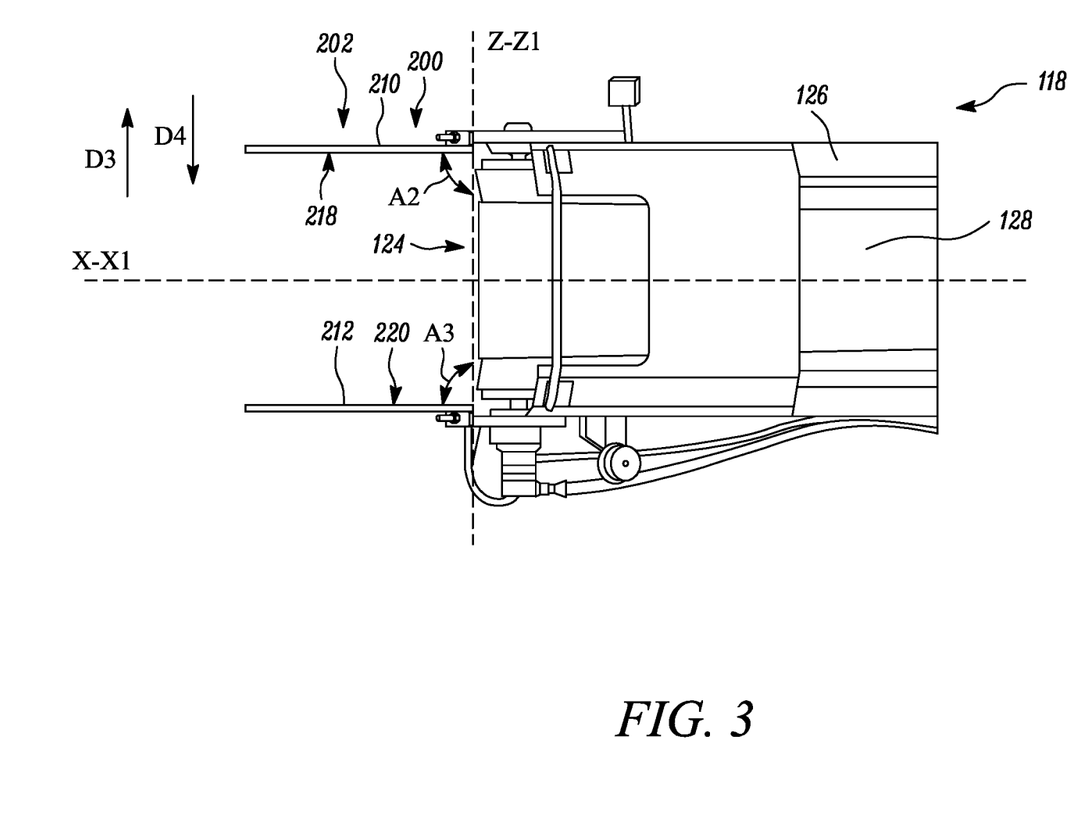

Referring to FIG. 3, the second and third deflector plates 210, 212 are connected to the frame structure 126. In an example, the second and third deflector plates 210, 212 may be pivotally connected to the frame structure 126. The second and third deflector plates 210, 212 extend along the longitudinal axis "X-X1". Further, the actuators 204 (shown in FIG. 5) may allow movement of the second and third deflector plates 210, 212 relative to the frame structure 126. The actuators 204 may allow movement of the respective second and third deflector plates 210, 212 relative to the lateral axis "Z-Z1". In an example, a single actuator 204 may be used to move the respective second and third deflector plates 210, 212 relative to the frame structure 126. Alternatively, two actuators 204 may be used to move the respective second and third deflector plates 210, 212 relative to the frame structure 126.

Further, the second and third deflector plates 210, 212 may move in a third direction "D3" or a fourth direction "D4" that is opposite to the third direction "D3". The second deflector plate 210 is disposed at a second angle "A2" relative to the lateral axis "Z-Z1". Further, the third deflector plate 212 is disposed at a third angle "A3" relative to the lateral axis "Z-Z1". In some embodiments, the second angle "A2" may be equal to the third angle "A3". Alternatively, the second and third angles "A2", "A3" may have different values, without any limitations. The second and third deflector plates 210, 212 adjust the material flow based on the second and third angles "A2", "A3". Further, the second and third deflector plates 210, 212 define a second deflector surface 218 and a third deflector surface 220, respectively. The second and third deflector surfaces 218, 220 deflect a portion of the material 134 (see FIG. 1) exiting the conveyor 122 towards the receptacle 104. In this embodiment, the second and third deflector surfaces 218, 220 are flat surfaces. In other embodiments, the second and third deflector surfaces 218, 220 may include a concave shape, a biconcave shape, a convex shape, and the like.

The second and third deflector plates 210, 212 may be moved based on a location at which the material 134 needs to be directed. Accordingly, the second and third deflector plates 210, 212 may move in the third or fourth directions "D3", "D4". In some embodiments, the second and third deflector plates 210, 212 may move in the same direction. For example, each of the second and third deflector plates 210, 212 may move in the third direction "D3" or each of the second and third deflector plates 210, 212 may move in the fourth direction "D4". In other embodiments, the second and third deflector plates 210, 212 may move in opposite directions. For example, the second deflector plate 210 may move in the third direction "D3" and the third deflector plate 212 may move in the fourth direction "D4", and vice versa.

Figure 4:
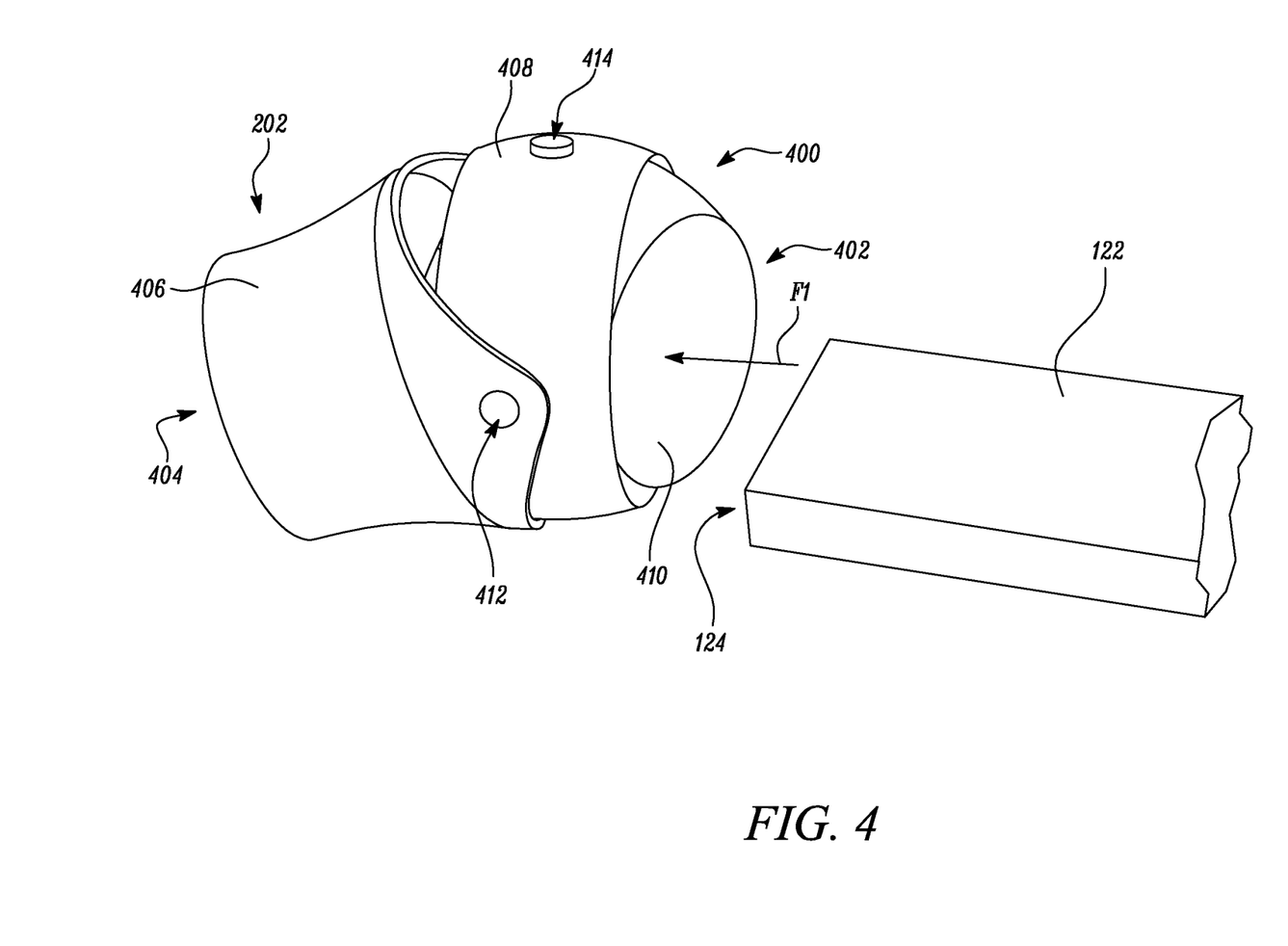
FIG. 4 illustrates another type of the adjustable deflector associated with the material transfer system of the machine of FIG. 1.

In another exemplary embodiment, the adjustable deflector 202 includes a nozzle 400 capable of redirecting the flow of milled material in one or both of a vertical direction and a horizontal direction. Referring now to FIG. 4, in some embodiments, the adjustable deflector 202 may include the nozzle 400. FIG. 4 is a schematic illustration of the conveyor 122 and the nozzle 400. The nozzle 400 is located proximate to the discharge end 124 of the conveyor 122 for receiving and directing the material 134 (see FIG. 1) towards the material holding space 106 (see FIG. 1). The material 134 flows in a flow direction "F1" through the nozzle 400. In the illustrated example, the nozzle 400 includes a gimbal type nozzle. It should be noted that the nozzle 400 may embody any type of nozzle that is generally known in the art. The nozzle 400 includes an inlet 402 that receives the material 134 from the conveyor 122 and an outlet 404 that directs the material 134 towards the material holding space 106. The nozzle 400 includes a generally circular cross-section herein. Alternatively, the nozzle 400 may include a square cross-section, a rectangular cross-section, and the like, without any limitations.

Further, a movement of the nozzle 400 may be controlled so that the material 134 may be directed towards a specific location in the material holding space 106. The nozzle 400 includes a first portion 406, a second portion 408, and a third portion 410. The second and third portions 408, 410 are disposed proximate to the inlet 402 of the nozzle 400. Further, the third portion 410 is held stationary. The first portion 406 is movable relative to the second portion 408 about points 412 (one of which is shown herein). Moreover, the second portion 408 is movable relative to the third portion 410 about points 414 (one of which is shown herein). The first and second portions 406, 408 may be moved in order to direct the material 134 towards specific locations, as per requirements. In some example, the first and second portions 406, 408 may be rotated by one or more actuators 204 (see FIG. 5). Further, the material transfer system 200 may include any other combination of components that serves the purpose of redirecting the material 134 towards specific locations in the material holding space 106, without limiting the scope of the present disclosure.

Referring now to FIG. 5, the material transfer system 200 includes a sensor 222 positioned proximate to the discharge end 124 of the conveyor 122. The sensor 222 monitors the material holding space 106 (see FIG. 1) of the receptacle 104. In some examples, the sensor 222 may generate signals corresponding to a material fill level or a distribution of the material 134 (see FIG. 1) in the material holding space 106. Such signals may be indicative of locations in the material holding space 106 that are underfilled or overfilled with the material 134. More particularly, the sensor 222 may generate data corresponding to locations that have low amount of the material 134 and/or locations that have more amount of the material 134. Additionally, or alternatively, the sensor 222 may generate signals indicative of a position of the receptacle 104 relative to the machine 102.

Further, the sensor 222 may be coupled with the frame structure 126. The material transfer system 200 may include a single sensor 222 or multiple sensors 222. The sensor 222 includes an image capturing device, an infrared sensor, or an ultrasonic sensor. The image capturing device may embody a camera module that monitors the material holding space 106 of the receptacle 104. The camera module may provide a range of viewability of the material holding space 106. The camera module may capture and record image data, for example, still images, video streams, time lapse sequences, etc. The camera module may include a still camera, a camcorder, a video camera, and the like, without any limitations. The camera module may be a monochrome digital camera, a high-resolution digital camera, or any suitable digital camera. In other embodiments, the camera module may be coupled with the frame 112 (see FIG. 1) of the machine 102.

As illustrated, the material transfer system 200 includes the controller 206. The controller 206 is communicably coupled with the adjustable deflector 202 and the sensor 222. The controller 206 receives a first input signal from the sensor 222 or the machine operator for adjusting the position of the adjustable deflector 202. In one example, the first input signal may be received from the sensor 222. In such an example, the first input signal may be indicative of locations in the material holding space 106 that are overfilled or underfilled. Alternatively, the first input signal may be received from the machine operator via one or more input devices in the operator station 116 (see FIG. 1). Such input devices may be communicably coupled with the controller 206.

Further, the controller 206 determines an optimal position of the adjustable deflector 202 based on receipt of the first input signal. For example, when the first input signal is received from the sensor 222, the controller 206 may analyze the first input signal to determine the optimal position of the adjustable deflector 202 that may allow the material 134 to be directed towards a specific location in the material holding space 106. It should be noted that the term "optimal position of the adjustable deflector 202" as used herein may be defined as a position of the deflector plates 208, 210, 212 (see FIGS. 2 and 3) or the nozzle 400 that may allow the material 134 to be directed towards a specific location in the material holding space 106 or a position of the deflector plates 208, 210, 212 or the nozzle 400 that may allow the material holding space 106 to be uniformly filled.

Further, the controller 206 generates the first command signal for adjusting the position of the adjustable deflector 202 to the optimal position. In one example, the controller 206 controls the one or more actuators 204 for adjusting the position of the adjustable deflector 202 based on receipt of the first input signal. In such an example, the controller 206 may transmit the first command signal to the one or more actuators 204 of the adjustable deflector 202 to adjust the position of the adjustable deflector 202.

In another example, the controller 206 transmits the first command signal to a notification system 224 for notifying the machine operator regarding the optimal position of the adjustable deflector 202. Further, the machine operator may manually adjust the position of the adjustable deflector 202 based on the first command signal. Accordingly, the machine operator may use the one or more input devices to control the actuators 204 of the adjustable deflector 202 for adjusting the position of the adjustable deflector 202. The notification system 224 can include a single device or multiple devices present at different locations, and the controller 206 may transmit data to the single or multiple devices. The notification system 224 may be positioned in the operator station 116 of the machine 102. The notification system 224 may be present with the machine operator, an operator of the receptacle 104 (see FIG. 1), or a personnel in charge of material transferring operation. In some examples, the notification system 224 may embody a handheld device and notifications may be presented thereon. Further, the notification system 224 may be a portable computing device that operates using a portable power source such as a battery. The portable computing device may include a mobile phone, a smart phone, a palm top, a tablet, a laptop, and the like.

The notification system 224 may embody a user interface. The notification system 224 may include a display device such as a Liquid Crystal Display (LCD), a Light Emitting Diode (LED) display, an Organic Light Emitting Diode (OLED) display, and the like. The notification system 224 may provide text messages. The notification system 224 may display the notifications via a Short Message Service (SMS), a Multimedia Message Service (MMS), a poll notification, an Electronic Mail (e-mail), etc. Alternatively, the notification system 224 may include an audio device that provides audible notifications, or an audio-visual module. The audio device may include a speaker present inside the operator station 116 or outside the operator station 116 to provide audible notifications to the machine operator.

In some embodiments, the controller 206 also generates a second command signal for controlling the conveyor speed of the conveyor 122 and/or the conveyor position of the conveyor 122 based on receipt of the first input signal. In an example, the conveyor 122 may swing side to side and/or raised/lowered to adjust the conveyor position. Accordingly, the conveyor 122 may be moved in any one of the first, second, third, or fourth directions "D1", "D2", "D3", "D4" relative to the frame 112 to vary the throw distance "T" (see FIG. 1) of the material 134. Further, the conveyor speed may also be increased or decreased to vary the trajectory of the material 134 exiting the conveyor 122. Thus, the conveyor position and/or the conveyor speed may be adjusted such that the desirable trajectory of the material 134 may be obtained.

In one example, the controller 206 controls the conveyor speed and/or the conveyor position based on receipt of the first input signal. More particularly, in addition to adjustments in the position of the adjustable deflector 202, the controller 206 may transmit the second command signal to the motor 130 to adjust the conveyor speed of the second conveyor 122 and/or to the actuator 132 to adjust the conveyor position of the second conveyor 122. In one example, the controller 206 transmits the second command signal to the motor 130 of the conveyor 122 to adjust the conveyor speed to an optimal conveyor speed of the conveyor 122. Additionally, or alternatively, the controller 206 controls the actuator 132 associated with the second conveyor 122 to adjust the conveyor position to an optimal conveyor position of the conveyor 122. It should be noted that the terms "optimal conveyor speed" and "optimal conveyor position" as used herein may correspond to the conveyors speed and conveyor position, respectively, that may allow the material 134 to be directed towards a specific location in the material holding space 106 or the conveyor speed and conveyor position that may allow the material holding space 106 to be uniformly filled.

In another example, the controller 206 transmits the second command signal to the notification system 224 for notifying the machine operator regarding the optimal conveyor speed of the conveyor 122 and/or the optimal conveyor position of the conveyor 122. Thus, in addition to adjustments in the position of the adjustable deflector 202, the machine operator may manually adjust the conveyor speed and/or the conveyor position based on the second command signal. The machine operator may use one or more input devices present in the operator station 116 to control the conveyor speed and/or the conveyor position.

The controller 206 may embody a single microprocessor or multiple microprocessors for receiving signals from various components of the machine 102. Numerous commercially available microprocessors may be configured to perform the functions of the controller 206. It should be appreciated that the controller 206 may embody a machine microprocessor capable of controlling numerous machine functions. A person of ordinary skill in the art will appreciate that the controller 206 may additionally include other components and may also perform other functions not described, herein.

It is to be understood that individual features shown or described, for one embodiment may be combined with individual features shown or described, for another embodiment. The above described, implementation does not in any way limit the scope of the present disclosure. Therefore, it is to be understood although some features are shown or described, to illustrate the use of the present disclosure in the context of functional segments, such features may be omitted from the scope of the present disclosure without departing from the spirit of the present disclosure as defined in the appended claims.

INDUSTRIAL APPLICABILITY

Figure 6:
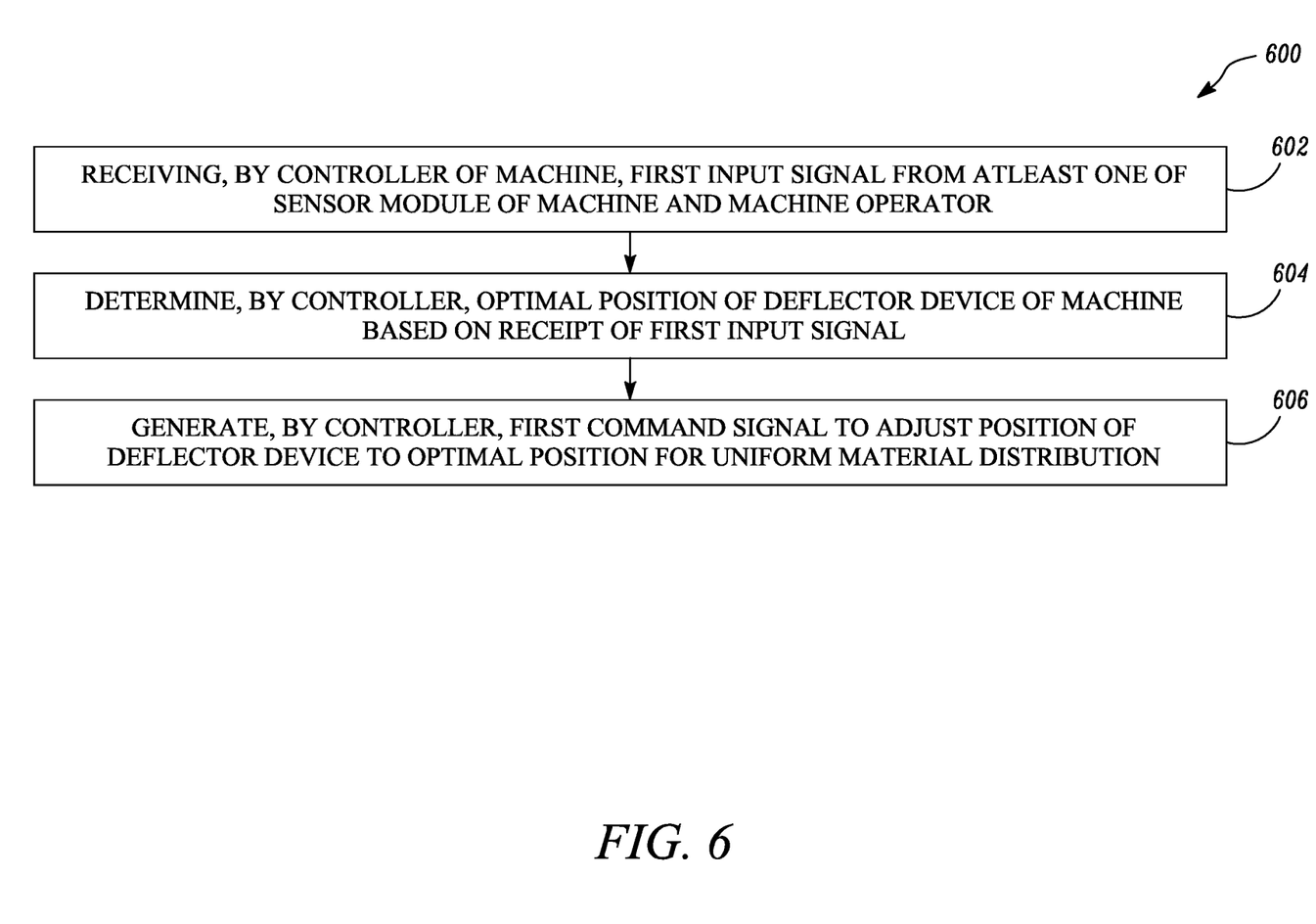
FIG. 6 illustrates a flowchart for a method of operating the machine.

FIG. 6 illustrates a flowchart for a method 600 of operating the machine 102. The machine 102 includes the conveyor 122 for transferring the material 134 into the material holding space 106 of the receptacle 104. At step 602, the controller 206 receives the first input signal from the sensor 222 of the machine 102 or the machine operator. The sensor 222 is positioned proximate to the discharge end 124 of the conveyor 122 for monitoring the material holding space 106 of the receptacle 104. It should be noted that the sensor 222 including the image capturing device, the infrared sensor, and/or the ultrasonic sensor is coupled to the conveyor 122.

At step 604, the controller 206 determines the optimal position of the adjustable deflector 202 of the machine 102 based on receipt of the first input signal. The adjustable deflector 202 is positioned proximate to the discharge end 124 of the conveyor 122 for deflecting the material 134 exiting the conveyor 122. Further, the adjustable deflector 202 including the deflector plate 208, 210, 212 or the nozzle 400 is coupled to the conveyor 122. In one example, three or more deflector plates 208, 210, 212 are coupled to the conveyor 122.

At step 606, the controller 206 generates the first command signal to adjust the position of the adjustable deflector 202 to the optimal position. In one example, the one or more actuators 204 are communicably coupled with the controller 206 for receiving the first command signal. The one or more actuators 204 adjust the position of the adjustable deflector 202 relative to the conveyor 122. Further, the one or more actuators 204 adjust the position of the adjustable deflector 202 based on receipt of the first input signal. In another example, the controller 206 transmits the first command signal to the notification system 224 for notifying the machine operator regarding the optimal position of the adjustable deflector 202.

In some embodiments, the controller 206 also generates the second command signal for controlling the conveyor speed of the conveyor 122 and/or the conveyor position of the conveyor 122 based on receipt of the first input signal. In one example, the controller 206 controls the conveyor speed and/or the conveyor position based on receipt of the first input signal. In another example, the controller 206 transmits the second command signal to the notification system 224 for notifying the machine operator regarding the optimal conveyor speed of the conveyor 122 and/or the optimal conveyor position of the conveyor 122.

The material transfer system 200 and the method 600 of the present disclosure provides a means to adjust the adjustable deflector 202 positioned at the discharge end 124 of the conveyor 122 in order to direct the material 134 towards desired locations in the material holding space 106. The material transfer system 200 can be retrofitted in existing machines and provides a simple technique for uniform distribution of the material 134 in various material holding spaces.

In some examples, the adjustable deflector 202 may be automatically controlled by the controller 206 thereby minimizing operator efforts. Alternatively, the controller 206 may provide notifications to the machine operator and the machine operator may manually operate the adjustable deflector 202. Further, the adjustments in the adjustable deflector 202 may allow the conveyor 122 to operate at higher speeds which may allow less material 134 to be carried on the conveyor 122 at a given instance of time. This phenomenon may in turn lead to reduction in a weight of the material 134 on the conveyor 122.

The present disclosure combines usage of the adjustable deflector 202 and the sensor 222 to track the location of the receptacle 104 and the material fill level in the material holding space 106 to assist in uniform material distribution. More particularly, the sensor 222 of the material transfer system 200 monitors the material holding space 106 to generate signals corresponding to the material fill level and the distribution of the material 134 in the material holding space 106. Based on the signals received from the sensor 222, the controller 206 may generate and transmit signals for adjusting the adjustable deflector 202 and/or the conveyor position/conveyor speed to allow uniform distribution of the material 134 in the material holding space 106.

Further, the control of the adjustable deflector 202 and/or the conveyor position/conveyor speed may allow an optimized filling of the material holding space 106. It should be noted that the adjustment of the conveyor position/conveyor speed in addition to the adjustment of the adjustable deflector 202 may further improve control over material transferring operations resulting in higher material transfer efficiency.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A material transfer system for a machine, the material transfer system comprising:
   a conveyor adapted to transfer material into a material holding space of a receptacle, wherein the conveyor defines a discharge end;
   an adjustable deflector positioned proximate to the discharge end of the conveyor, wherein the adjustable deflector is adapted to deflect the material exiting the conveyor;
   a sensor positioned proximate to the discharge end of the conveyor, wherein the sensor is configured to monitor the material holding space of the receptacle; and
   a controller communicably coupled with the sensor, wherein the controller is configured to:
      receive a first input signal from at least one of the sensor and a machine operator for adjusting a position of the adjustable deflector;
      determine an optimal position of the adjustable deflector based on receipt of the first input signal; and
      generate a first command signal for adjusting the position of the adjustable deflector to the optimal position.

2. The material transfer system of claim 1, wherein the adjustable deflector includes at least one of a deflector plate and a nozzle.

3. The material transfer system of claim 2, wherein the adjustable deflector includes at least three deflector plates.

4. The material transfer system of claim 1, wherein the adjustable deflector includes at least one actuator communicably coupled with the controller for receiving the first command signal, and wherein the at least one actuator is adapted to adjust the position of the adjustable deflector relative to the conveyor.

5. The material transfer system of claim 4, wherein the controller is configured to control the at least one actuator for adjusting the position of the adjustable deflector based on receipt of the first input signal.

6. The material transfer system of claim 1, wherein the controller is configured to transmit the first command signal to a notification system for notifying the machine operator regarding the optimal position of the adjustable deflector.

7. The material transfer system of claim 1, wherein the controller is further configured to generate a second command signal for controlling at least one of a conveyor speed of the conveyor and a conveyor position of the conveyor based on receipt of the first input signal.

8. The material transfer system of claim 7, wherein the controller is configured to control at least one of the conveyor speed and the conveyor position based on receipt of the first input signal.

9. The material transfer system of claim 7, wherein the controller is configured to transmit the second command signal to a notification system for notifying the machine operator regarding at least one of an optimal conveyor speed of the conveyor and an optimal conveyor position of the conveyor.

10. The material transfer system of claim 1, wherein the sensor includes at least one of an image capturing device, an infrared sensor, and an ultrasonic sensor.

11. A method of operating a machine, the machine including a conveyor adapted to transfer material into a material holding space of a receptacle, the method comprising:

receiving, by a controller of the machine, a first input signal from at least one of a sensor of the machine and a machine operator, wherein the sensor is positioned proximate to a discharge end of the conveyor for monitoring the material holding space of the receptacle;

determining, by the controller, an optimal position of an adjustable deflector of the machine based on receipt of the first input signal, wherein the adjustable deflector is positioned proximate to the discharge end of the conveyor for deflecting the material exiting the conveyor; and generating, by the controller, a first command signal to adjust a position of the adjustable deflector to the optimal position.

12. The method of claim 11 further comprising coupling, to the conveyor, the adjustable deflector including at least one of a deflector plate and a nozzle.

13. The method of claim 12 further comprising coupling, to the conveyor, at least three deflector plates.

14. The method of claim 11 further comprising communicably coupling at least one actuator with the controller for receiving the first command signal, wherein the at least one actuator is adapted to adjust the position of the adjustable deflector relative to the conveyor.

15. The method of claim 14 further comprising controlling, by the controller, the at least one actuator for adjusting the position of the adjustable deflector based on receipt of the first input signal.

16. The method of claim 11 further comprising transmitting, by the controller, the first command signal to a notification system for notifying the machine operator regarding the optimal position of the adjustable deflector.

17. The method of claim 11 further comprising generating, by the controller, a second command signal for controlling at least one of a conveyor speed of the conveyor and a conveyor position of the conveyor based on receipt of the first input signal.

18. The method of claim 17 further comprising controlling, by the controller, at least one of the conveyor speed and the conveyor position based on receipt of the first input signal.

19. The method of claim 17 further comprising transmitting, by the controller, the second command signal to a notification system for notifying the machine operator regarding at least one of an optimal conveyor speed of the conveyor and an optimal conveyor position of the conveyor.

20. The method of claim 11 further comprising coupling, to the conveyor, the sensor including at least one of an image capturing device, an infrared sensor, and an ultrasonic sensor.

* * * * *